United States Patent [19]

Baxter

[11] 4,224,752
[45] Sep. 30, 1980

[54] ELECTROMAGNETIC ANNUNCIATOR

[75] Inventor: Ronald W. Baxter, Shepperton, England

[73] Assignee: Page Engineering Company (Sunbury-on-Thames), Ltd., Middlesex, England

[21] Appl. No.: 950,473

[22] Filed: Oct. 11, 1978

[30] Foreign Application Priority Data

May 24, 1978 [GB] United Kingdom ............... 21880/78

[51] Int. Cl.³ .............................................. G09F 9/00
[52] U.S. Cl. ........................................ 40/463; 40/507; 340/378.1
[58] Field of Search ................. 40/463, 466, 468, 469, 40/506, 507, 426; 340/366 F, 378.1, 378.2, 378.5, 378.6, 381

[56] References Cited

U.S. PATENT DOCUMENTS

| Re. 24,943 | 2/1961 | Skrobisch | 340/381 X |
|---|---|---|---|
| 994,992 | 6/1911 | Fisher | 40/463 |
| 1,298,871 | 4/1919 | Bobroff | 40/463 |
| 1,308,658 | 7/1919 | Carr | 40/463 |
| 2,588,183 | 3/1952 | Vigon | 40/542 |
| 2,779,016 | 1/1957 | Snell | 340/378.1 |
| 3,309,696 | 3/1967 | Alster et al. | 340/381 X |
| 3,616,555 | 11/1971 | Campbell | 40/463 |
| 3,950,031 | 5/1966 | Bowman | 299/76 |

FOREIGN PATENT DOCUMENTS 200514 4/1924 United Kingdom ...................... 40/591

Primary Examiner—John F. Pitrelli
Assistant Examiner—G. Lee Skillington
Attorney, Agent, or Firm—Graybeal & Uhlir

[57] ABSTRACT

An indicating device including an indicator having a plurality of information bearing surfaces adapted to be movable from a first position to a plurality of second positions. The indicating device includes an armature member coupled to the indicator and adapted to pivot about an axis with the armature member having a plurality of radially extending armature pole pieces disposed at its opposite ends. A stator member having a plurality of pole pieces disposed adjacent each armature pole piece and in a spaced apart relation therefrom such that when the armature member pivots about is axis, one of the armature pole pieces rotates toward one of the stator pole pieces, and the other of the armature pole pieces rotates away from the other of the stator pole pieces. A plurality of windings disposed about the stator are adapted to generate magnetic fields which are coupled through the stator pole pieces to the armature pole pieces thereby attracting one armature pole piece and simultaneously repelling the other armature pole piece causing the armature member to pivot about its axis and the indicator to move from a first position to a second position.

30 Claims, 5 Drawing Figures

ELECTROMAGNETIC ANNUNCIATOR

DESCRIPTION

1. Technical Field

The present invention relates in general to an indicating device and more particularly to an electromagnetic annunciator for use in aircraft instrument panels.

2. Background Art

In modern commercial aircraft, it is necessary to provide current information concerning the status of various aircraft systems to the pilot, flight engineer or the like. This information must be presented and displayed in a quick, reliable and easily comprehendable manner. Depending upon the aircraft subsystem and the particular parameter, the information may require the presentation and display of a range of conditions such as deviations in the aircraft altitude, heading or the like.

In the prior art, one method employed to display such aircraft subsystem information involved the use of backlit displays whereby the information to be displayed was contained on a clear, transparent material, such as plastic or the like, and illuminated from behind. This method, however, was susceptible to external aircraft environmental conditions in that when the aircraft encountered bright sunlight or when it maneuvered, as by a banking turn away from the sun, the display became washed out and difficult to read.

An alternate method involved the use of solid state displays, such as a matrix of light emitting diodes or the like. This method was also susceptible to external aircraft environmental conditions. Additionally, when a range of conditions were displayed, the display became dim and difficult to read due to the increased power drain caused by the additional light emitting diodes.

The present invention overcomes these problems of the prior art by providing an electromagnetic annunciator having an indicator with a plurality of information bearing surfaces adapted to be movable from a neutral or first position to a plurality of other positions. The information bearing surfaces are insensitive to the external aircraft environment, and are adapted to be viewable within an aperture so as to be easily and quickly comprehendable.

Campbell, U.S. Pat. No. 3,616,555, discloses a compact annunciator package having an indicator with a plurality of information bearing surfaces coupled at opposite ends through rack and pinions to a pair of separate and independently operable solenoids. The Campbell annunciator relies entirely upon the principal of magnetic attraction of accomplish the rotational movement of the indicator. When power is applied to one solenoid, the resulting magnetic field attracts that solenoid's associated armature member. The armature movement is coupled to one end of the indicator (through a rack and pinion) thereby causing the indicator to rotate. As a result, a necessary condition precedent to the movement of the indicator is the non-application of power to the other solenoid. If, through the occurrence of a malfunction or the like, power is applied to one solenoid and subsequently applied to the second solenoid while the first is still active, or its power is simultaneously applied to both solenoids, the indicator will no longer rotate since two equal and opposite rotational forces are coupled to opposite ends of the indicator. Any priority system preventing the occurrence of such a condition must of necessity be external to the disclosed annunciator.

The present invention differs from Campbell in that the present invention uses a single stator to generate a plurality of magnetic fields of different intensities and opposite polarities. These magnetic fields are coupled through a plurality of stator pole pieces to a plurality of pole pieces disposed upon a rotatable armature member. The magnetic fields simultaneously attract and repel the armature pole pieces. The attraction of one armature pole piece toward its associated stator pole piece and the repulsion of the other armature pole piece away from its associated stator pole piece generates a torque coupled to both ends of the indicator causing the information bearing surfaces to rotate from a first position to a second position. The generation of a magnetic field of different intensities and opposite polarities gives the present invention an internal priority system since in the event of a malfunction, one magnetic field effectively cancels and overrides the other magnetic field ensuring the rotational movement of the information bearing surfaces to a safe or neutral position.

DISCLOSURE OF THE INVENTION

According to one aspect of the present invention, an indicating device including an indicator having a plurality of information bearing surfaces adapted to be movable from a first position to a plurality of second positions comprises an armature member coupled to the indicator and adapted to pivot about an axis with the armature member having a plurality of radially extending armature pole pieces disposed at opposite ends thereof. A stator member has a plurality of pole pieces disposed adjacent the armature pole pieces and in a spaced apart relationship therefrom such that when the armature member pivots about its axis, one of the armature pole pieces rotates toward one of the stator pole pieces and the other of the armature pole pieces rotates away from the other of the stator pole pieces. A plurality of windings disposed about the stator member are adapted to generate magnetic fields causing one stator pole piece to attract its associated armature pole piece and the other stator pole piece to repel its associated armature pole piece causing the armature member to pivot about its axis and the indicator to move from a first position to a second position.

According to a further aspect of the present invention an indicating device having a movable indicator comprises an armature member operably connected to the indicator with the armature member having a plurality of radially extending pole pieces disposed at its opposite ends. An essentially E-shaped stator member has a plurality of pole pieces at its outer limbs. The stator pole pieces are separated from the plurality of armature pole pieces by a plurality of air gaps with the stator member and armature member being so relatively pivoted such that as the armature member pivots one air gap increases as the other air gap decreases. The stator member has an additional pole piece disposed upon the middle limb and adapted to partially surround the central portion of the armature member. Winding meand disposed about the stator member magnetizes the stator pole pieces with the middle limb pole piece being of one polarity and the other pole pieces being of the opposite polarity. The winding means further magnetizes the elongate armature member with opposite polarities at opposite ends, and reverses the polarity of one member without reversing the polarity of the other member.

The foregoing and other objects, features, and advantages of the present invention will become more apparent in light of the detailed description of preferred embodiments thereof as set forth hereafter, and illustrated in the accompanying drawings.

BEST MODE OF CARRYING OUT THE INVENTION

Figure 1:
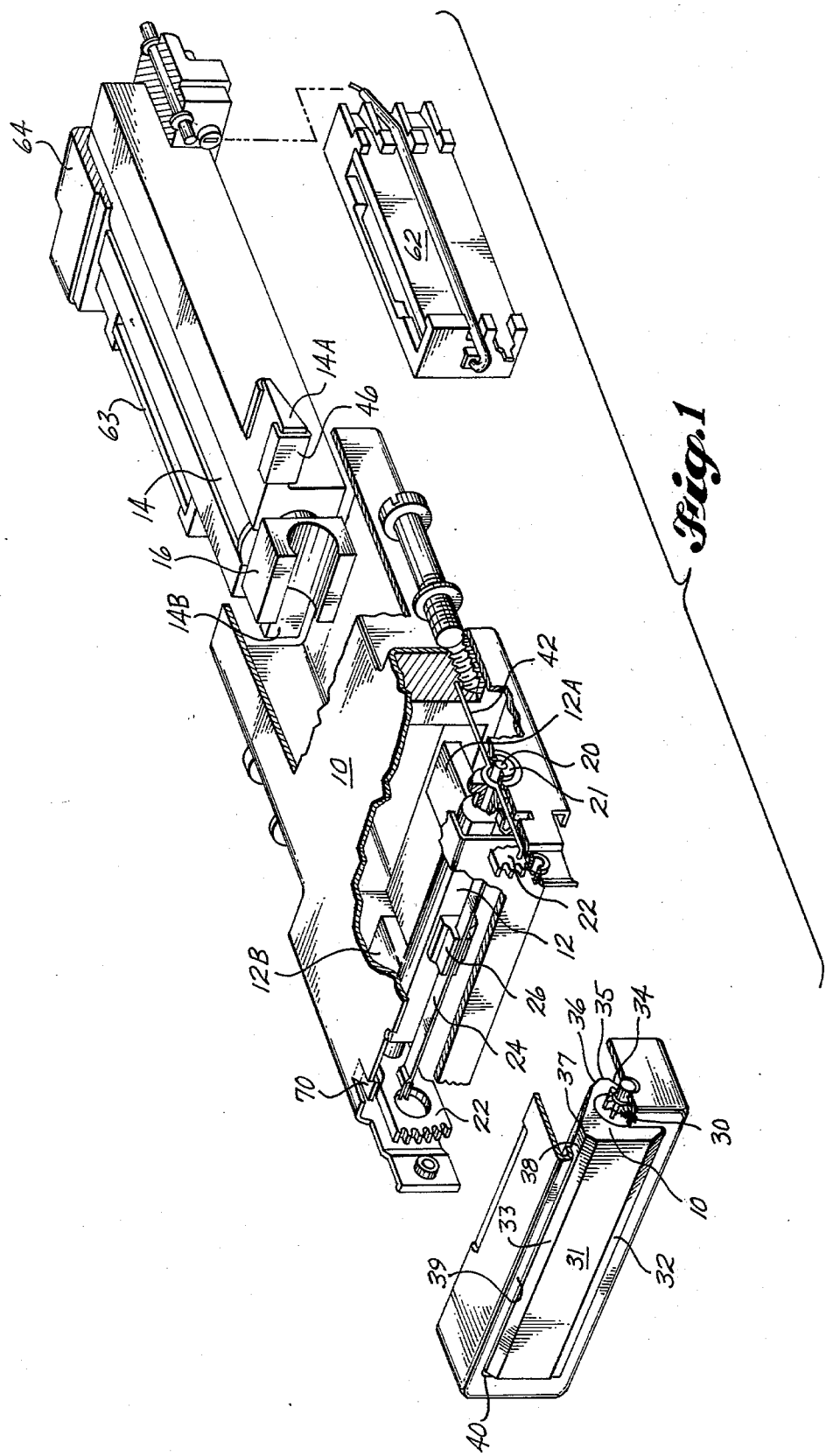
FIG. 1 is a perspective view, partially exploded for the sake of clarity, of a typical indicating device according to the pesent invention.

In one embodiment of the present invention, as shown in FIG. 1, the indicating device comprises a metal housing 10, an armature member 12 adapted for pivotal rotation within the housing 10 and having a plurality of armature pieces 12A and 12B disposed at opposite ends thereon, a stator member 14 secured within frame 10 and having a plurality of pole pieces 14A, 14B, and 16 disposed thereon, and an indicator 18 adapted for rotational movement within the frame 10 and operably connected to the armature member 12.

The armature member 12 comprises an elongate polarizing bar magnet to which is secured a plurality of armature pole pieces 12A and 12B at each end thereof. The pole pieces 12A and 12B are in the form of a flat plate and extend radially away from the longitudinal axis of the armature member 12. Each end of the armature member 12 has a pivot pin 20 mounted in a corresponding pivot 21 disposed within the metal frame 10, and in this manner the armature member is adapted to pivotally rotate about its longitudinal axis.

A plurality of toothed quadrants 22 are disposed at opposite ends of the armature member 12 and are adapted for independent rotation about the plurality of pivots 21. A spring blade 24 extends across the width of the metal housing 10 and is secured to the plurality of toothed quadrants 22 at each end thereof. The spring blade 24 connects the toothed quadrants to the armature member 12 through spring clamp 26 secured to armature member 12, and provides a resilient means for transferring the rotational movement of the armature member 12 to the plurality of toothed quadrants 22 allowing the indicator 18 to be brought to rest in a precise position irrespective of the extent of movement of the armature 12.

As shown in FIG. 1, the indicator 18 is essentially a prism having nine sides and toothed wheels 30 disposed at either end. The toothed wheels 30 are adapted to mesh with he plurality of toothed quadrants 22 such that rotational movement of the armature member 12 is transferred through the plurality of toothed quadrants and the plurality of toothed wheels to the indicator 18. The indicator 18 has a plurality of information bearing surfaces 31, 34, and 37 which may be annotated by any suitable instruction. Each corner of the prism has a plurality of beveled edge pairs 32 and 33, 35 and 36, 38 and 39, with each edge of the edge pairs being inclined with respect to its adjacent information bearing surface. The plurality of beveled edge pairs permit the plurality of information bearing surfaces 31, 34, and 37 to be positioned forward of the aperture 40 and thus closer to a viewer.

A plurality of restoring springs 42 are disposed within the metal housing 10 adjacent the plurality of toothed quadrants 22. The restoring springs 42 are secured at one end to the toothed quadrants and at the other end to the metal housing 10. The restoring springs 42 are adapted to urge the toothed quadrants 22 and the indicator 18 to a neutral position, as for example, exposing information bearing surface 31 within aperture 40. Each restoring spring is wound in an opposite direction from the other restoring spring so as to compensate for the effect of temperature variations on the neutral position. The restoring springs also exert a constant opposed tortional force on the toothed quadrants 22 thus stiffening them against external unbalancing forces.

By way of a non-limiting example and with reference to FIG. 1, the mechanical operation of the indicating device is set forth below. In a neutral position, information bearing surface 31 is exposed within aperture opening 40. Clockwise rotational movement of the armature member 12 is transferred through the blade spring 24 and the plurality of toothed quadrants 22 to the plurality of toothed wheels 30 and the indicator 18. The clockwise rotation of the armature member 12 results in a counterclockwise rotation of the indicator 18 thereby exposing information bearing surface 37 within aperture 40. Correspondingly, a counterclockwise rotation of the armature member 12 results in the indicator 18 being rotated in a clockwise direction exposing information bearing surface 34 in aperture 40.

Figure 2:
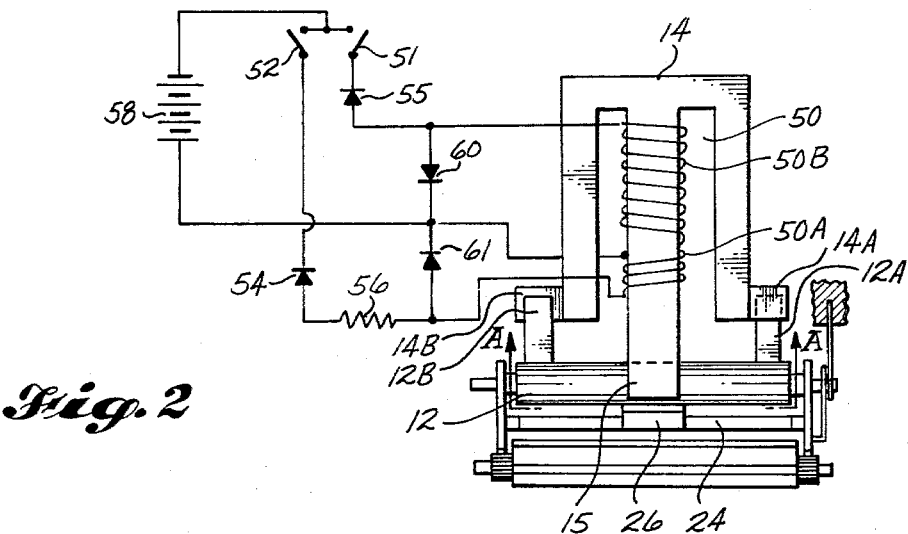
FIG. 2 is an electrical schematic diagram showing the electrical components and the stator windings of a typical indicating device according to the present invention.
Figure 3:
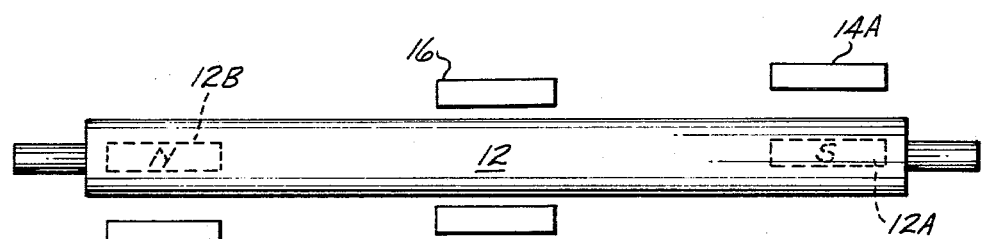
FIG. 3 is a schematic sectional elevation taken along lines A—A in FIG. 2 of a typical indicating device according to the present invention, showing the relative position of the armature member pole pieces and the stator member pole pieces when the members are in a neutral position.

The indicating device is operable by means of a stator generally designated at 14. With reference to FIGS. 1 and 2, the stator is assembled into a continuous iron core having generally an E-shape, with the end of the two outer limbs of the E-shaped core having a plurality of stator pole pieces 14A and 14B. The central limb of the E-shaped core has an additional stator pole piece 16 defining in part a cylindrical space which is dimensioned and positioned so that stator pole piece 16 surrounds the central portion of armature member 12 leaving an air gap of predetermined constant width therearound. The stator pole pieces 14A and 14B project in opposite directions from the sides of the stator member 14 with one pole piece being positioned at the upper edge of the stator member while the other pole piece is positioned at the lower edge. By way of example, stator pole piece 14A is positioned above and in a spaced apart relation with respect to armature pole piece 12A (see FIGS. 3–5). Stator pole pieces 14A, 14B have a spacer sleeve 46 constructed from any suitable nonmagnetic material to ensure that an air gap of relatively high reluctance remains between the stator pole piece and its associated armature pole piece.

With reference to FIG. 2, the stator member 14 has a plurality of windings, shown generally at 50, adapted to provide an electrical connection to a plurality of end terminals 51, 52, and an intermediate connection at 53. In the embodiment as shown in FIG. 2, winding 50 comprises two separate oppositely wound windings shown generally at 50A and 50B. In the embodiment as shown, winding 50B has twice as many turns as winding 50A and will produce twice the magnetomotive force (MMF) as that produced by winding 50A when energized (as by a flow of current through the windings). It is to be understood, however, that windings 50A and 50B may each be wound to provide equal and opposite MMF forces (as by having the same number of turns) without departing from the spirit and scope of the present invention.

A plurality of anti-feedback diodes 54, 55 are included in the current loops of windings 50A and 50B to ensure that current passes through these windings in the desired direction. A current limiting resistor 56 connected to the anode side of anti-feedback diode 54 is provided in the current loop of winding 50A to ensure that when winding 50A and 50B are connected to a low voltage current source 58, such as a battery or the like, an equal current flows through each winding.

With reference to FIG. 1, the electrical components as described above for the current loops of windings 50A and 50B are contained within a plurality of housings 62, 63 secured to either side of the stator member 14. The end terminals 51 and 52 as well as the intermediate connection 53 are contained within the terminal block 64 disposed at the rear of the stator member.

Referring now to FIGS. 2 through 5, the operation of the indicating device of the present invention will be described. Initially in FIG. 3, the stator member 14 and the winding 50 are not energized and no current is flowing through windings 50A, 50B. The armature member 12 and the plurality of armature pole pieces 12A and 12B remain in a neutral position with the information bearing surfaces 31 (FIG. 1) being visible through aperture 40.

Figure 4:
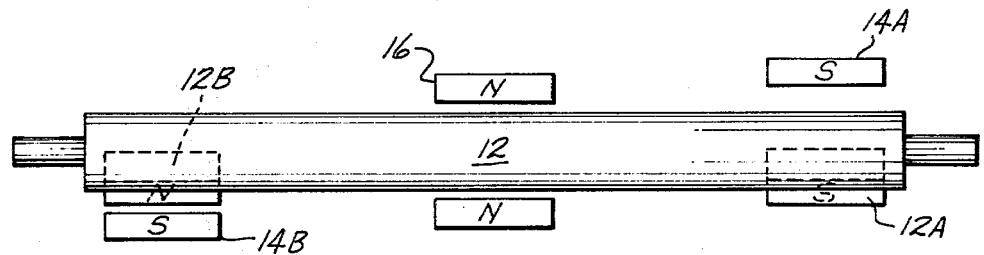
FIG. 4 is a schematic sectional elevation taken along lines A—A in FIG. 2 of a typical indicating device according to the present invention, showing the relative positions of the armature member pole pieces and the stator member pole pieces when a first winding is energized.

When winding 50A is energized, as by applying a ground signal to end terminal 52 from an external source such as a flight computer or the like, a magnetic field is generated at stator pole pieces 14A, 14B may become south poles with stator pole 16 becoming a north pole. In this situation, armature pole piece 12A will be repelled by stator pole piece 14A, while armature pole piece 12B will be attracted to stator pole piece 14B (as shown in FIG. 4). As a result, the armature member 12 will rotate in a clockwise direction thereby causing the indicator to rotate in a counterclockwise direction to expose information bearing surfaces 37 within aperture 40. (FIG. 1). The plurality of toothed quadrants 22 are restrained against excessive rotational movement in either the clockwise or counterclockwise direction by the plurality of arresting stops 70 disposed within metal housing 10 (see FIG. 1).

Figure 5:
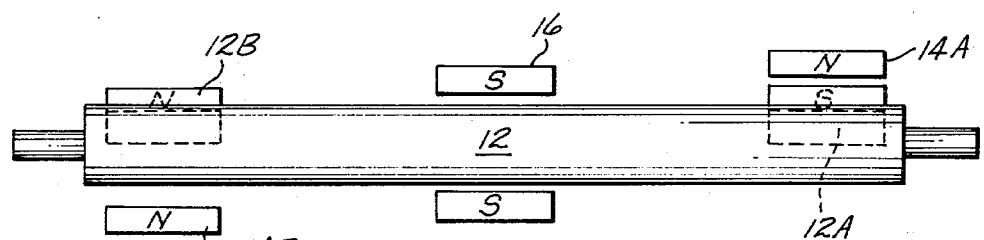
FIG. 5 is a schematic sectional elevation taken along lines A—A in FIG. 2 of a typical indicating device according to the present invention, showing the relative position of the armature member pole pieces and the stator member pole pieces when the second winding is energized.

If winding 50B is now energized, as by applying a ground signal to end terminal 51, the magnetic field produced at stator pole pieces 14A, 14B will be twice that produced by winding 50A and will be of the opposite polarity. In this situation, the magnetic fields generated by windings 50A, 50B tend to cancel each other, but since the strength of the magnetic field generated by winding 50B is twice that of the field produced by winding 50A, stator pole pieces 14A, 14B become north poles with stator pole piece 16 becoming a south pole. As shown in FIG. 5, this results in the armature pole piece 12A being attracted to stator pole piece 14A thereby causing the armature member 12 to rotate in a counterclockwise direction. When this occurs the indicator 18 rotates in a clockwise direction through the first or neutral position (momentarily exposing information bearing face 31 in aperture 40) to a position exposing information bearing surface 34 within aperture 40. (FIG. 1). If winding 50B is energized initially, the E-shaped iron core of stator member 14 saturates early thereby limiting the MMF force produced at stator pole pieces 14A, 14B and the mechanical force applied by the plurality of toothed quadrants 22 against the plurality of arresting stops 70.

From the above description, it can be seen that the annunciator of the present invention has a built-in internal priority selection. For example, a message given priority can be placed upon the information bearing surface viewable when winding 50B is energized. As long as winding 50B is energized, that message will appear within aperture 40 (due to increased MMF generated by winding 50B) regardless of the current flowing through winding 50A.

Industrial Applicability

The present invention has industrial application in any situation where it is necessary to quickly and reliably provide information to a viewer concerning the status of operating equipment or machinery. It is particularly well adapted for use in the cockpit instrument panels of modern commercial jet aircraft to display aircraft subsystem information to the pilot, co-pilot or the like.

I claim:

1. An indicating device including an indicator having a plurality of information bearing surfaces adapted to be movable from a first position to a plurality of second positions comprising:
   (a) an elongate armature member pivotal about its axis coupled to said indicator, said member having a plurality of oppositely magnetically polarized armature pole pieces extending radially outwardly therefrom;
   (b) a stator member having a plurality of magnetizable pole pieces disposed adjacent said armature pole pieces with a gap therebetween such that when said armature member pivots about its axis, one of said armature member pole pieces rotates toward one of said stator pole pieces decreasing the gap therebetween and the other of said armature pole pieces simultaneously rotates away from the other of said stator pole pieces increasing the gap therebetween; and,
   (c) a plurality of windings disposed about the stator member for generating magnetic fields, said fields causing said stator pole pieces to be of the same magnetic polarity whereby said armature member is pivotal about its axis in response to the simultaneous attraction of one of said armature member pieces towards its associated stator pole piece and the repulsion of the other of said armature member pole pieces by its associated stator pole piece thereby rotating the armature member and moving the indicator from a first position to one of a plurality of second positions.

2. The indicating device of claim 1 in which said armature member comprises a bar magnet pivotal about its longitudinal axis.

3. The indicating device of claim 1 in which said stator member includes an additional stator pole piece having an essentially cylindrical shape and adapted to partially surround the central portion of said armature member.

4. The indicating device of claim 1 in which said stator member comprises an essentially E-shaped iron core having a plurality of windings thereon with the ends of the two outer limbs of said stator member having stator pole pieces of like polarity, and the end of the middle limb of said stator member having a stator pole piece of opposite polarity to the said other stator pole pieces.

5. The indicating device of claim 4 wherein said plurality of stator pole pieces of like polarity project in opposite directions perpendicular to the length of said limbs of said E-shaped iron core.

6. The indicating device of claim 5 wherein the plurality of stator pole pieces of like polarity are at least partially covered by a non-magnetic material to provide an air gap between said stator pole pieces and said armature pole pieces.

7. The indicating device of claim 4 wherein said E-shaped iron core has a pair of windings thereon, one of said pair of windings having substantially fewer turns than the other of said windings.

8. The indicating device of claim 7 wherein said winding having fewer turns is connected in series with a resistor.

9. The indicating device of claim 7 wherein each winding of said plurality of windings is connected in series with a diode.

10. The indicating device of claim 7 wherein each winding of said pair of windings is connected in parallel with a diode.

11. The indicating device of claim 1 wherein said armature member is operably connected to said indicator by a plurality of toothed quadrants adapted to mesh with a plurality of toothed wheels disposed at opposite ends of said indicator, said toothed quadrants being disposed at opposite ends of said armature member and independently rotatable thereabout, said toothed quadrants being resiliently connected to said armature member by a spring blade.

12. The indicating device of claim 11 further comprising restoring means engaging said toothed quadrants and secured to said indicator device, said restoring means being adapted to urge said toothed quadrants and said indicator to said first position.

13. The indicator device of claim 12 wherein said restoring means comprises a pair of springs wound in opposite directions from each other.

14. The indicator device of claim 1 wherein said indicator having a plurality of information bearing surfaces comprises a prism pivotal about its longitudinal axis.

15. The indicator device of claim 14, wherein each corner of said prism has a plurality of beveled edge pairs, with each edge of said edge pairs being inclined with respect to its adjacent information bearing surface.

16. The indicating device of claim 1 wherein said information bearing surfaces are movable when said windings simultaneously generate magnetic fields.

17. An indicating device including a movable indicator comprising:

(a) an elongate armature member operably connected to the indicator, said armature member having a pair of oppositely magnetically polarized radially extending armature pole pieces disposed at its opposite ends;

(b) an essentially E-shaped stator member having a pair of stator magnetizable pole pieces being respectively separated from said pair of armature pole pieces by air gaps, said stator and armature members pivoted relative to each other such that one air gap increases as the other air gap decreases, said stator member having a further magnetizable pole piece disposed upon the middle limb thereof partially surrounding the cenral portion of said armature member; and (c) a plurality of windings disposed about said stator member for generating magnetic fields, said field causing said stator pole pieces disposed at its outer limbs to be of the same magnetic polarity while causing said pole piece disposed upon the middle limb to be of the opposite magnetic polarity, said armature member being rotatable about its longitudinal axis responsive to the simultaneous attraction of one armature pole piece toward its associated stator pole piece and the repulsion of the other armature pole piece by its associated stator pole piece thereby rotating the armature member and moving the indicator from a first position to one of a plurality of second positions.

18. The indicator device of claim 17 wherein said armature member is pivoted about an axis which is generally parallel to the plane of said stator member and at right angles to the limbs thereon.

19. The indicating device of claim 17 wherein said stator pole pieces disposed upon the outer limbs of said E-shaped iron core project in opposite directions perpendicular to the length of said limbs of said E-shaped iron core.

20. The indicating device of claim 17 in which said armature member comprises a bar magnet adapted to pivot about its longitudinal axis.

21. The indicating device of claim 17 wherein said armature member is operably connected to said indicator by a pair of toothed quadrants adapted to mesh with a pair of toothed wheels disposed at opposite ends of said indicator, said toothed quadrants being disposed at opposite ends of said armature member and independently rotatable thereabout, said toothed quadrants being resiliently connected to said armature member by a spring blade.

22. The indicating device of claim 17 further comprising restoring means engaging said toothed quadrants and secured to said indicator device, said restoring means being adapted to urge said toothed quadrants and said indicator to said first position.

23. The indicating device of claim 22 wherein said restoring means comprises a pair of springs wound in opposite directions from each other.

24. The indicator device of claim 17 wherein said indicator having a plurality of information bearing surfaces comprises a prism pivotal about its longitudinal axis.

25. The indicator device of claim 24, wherein each corner of said prism has a plurality of beveled edge pairs, with each edge of said edge pair being inclined with respect to its adjacent information bearing surface.

26. The indicating device of claim 17 wherein said stator member has a pair of windings thereon, one of said pair of windings having substantially fewer turns than the other of said windings.

27. The indicating device of claim 26 wherein said winding having fewer turns is connected in series with a resistor.

28. The indicating device of claim 26 wherein each winding of said pair of windings is connected in series with a diode.

29. The indicating device of claim 26 wherein each winding of said pair of windings is connected in parallel with a diode.

30. The indicating device of claim 17 wherein said indicator is movable when said windings simultaneously magnetize said stator pole pieces.

* * * * *

UNITED STATES PATENT OFFICE
CERTIFICATE OF CORRECTION

Patent No. 4,224,752　　　　　　　　　Dated September 30, 1980

Inventor(s) Ronald W. Baxter

It is certified that error appears in the above-identified patent and that said Letters Patent are hereby corrected as shown below:

In the Abstract:
 Line 11, change "is" to -- its --.

In the Description:
 Column 1, line 53, after "attraction" change "of" to -- to --.

In Disclosure of the Invention:
 Column 2, line 61, change "meand" to -- means --.

In Best Mode of Carrying Out the Invention:
 Column 4, line 4, change "he" to -- the --.

Signed and Sealed this

Sixth Day of January 1981

|SEAL|

*Attest:*

*Attesting Officer*

SIDNEY A. DIAMOND
*Commissioner of Patents and Trademarks*